2,992,275
PROCESS FOR PREPARING OXYGEN-CONTAINING ORGANIC COMPOUNDS

Makoto Niwa and Yoshiaki Kikuchi, Tokyo, and Shigeo Kamimura and Masaru Onishi, Kawasaki-shi, Kanagawa-ken, Japan, assignors to Mitsubishi Kasei Kogyo Kabushiki Kaisha, Tokyo, Japan, a company of Japan
No Drawing. Filed Nov. 21, 1957, Ser. No. 697,791
Claims priority, application Japan Nov. 22, 1954
7 Claims. (Cl. 260—604)

This application is a continuation-in-part of our copending application Serial No. 546,266, filed November 10, 1955, and now abandoned, entitled: Process for Preparing Oxygen-Containing Organic Compounds.

This invention relates to the process for preparing oxygen-containing organic compounds, and in particular, the invention is concerned with the process for preparing water-soluble oxygen-containing organic compounds by reacting organic compounds having olefinic double bonds with carbon monoxide and hydrogen at high temperature and under high pressure.

When the compounds having olefinic double bonds are reacted with carbon monoxide and hydrogen at high temperature and high pressure in the presence of a cobalt catalyst, aldehydes are mainly produced. In such case, aldehydes, having one more carbon atom than the compounds having olefinic double bonds, are obtained, and the position of the aldehyde group is governed by that of the olefinic double bonds.

It must be noted that, in such oxygenation processes, when the compounds having olefinic double bonds are gaseous and when the aldehydes produced are water-soluble, a method different from the ordinary oxygenation processes is used. Namely, after the compounds having olefinic double bonds are mixed with carbon monoxide and hydrogen, the mixed gas is pressed into the reactor containing a proper inert liquid medium in which a catalyst has been dissolved or suspended. The hitherto practiced methods are:

(1) Fischer-Tropsch catalyst (cobalt thoria and diatomaceous earth) is suspended in toluene in a concentration of 3–5 percent by weight; a feed gas having the composition, $CO:H_2:ethylene=1:1:1$, is pressed thereinto at 90–120° C. at a pressure of 200 atm. The product contains 5–10 percent propionaldehyde and other products such as ethane, methylethylacrolein and cobalt carbonyl. The loss of cobalt as cobalt carbonyl is compensated for by adding fresh Fischer-Tropsch catalyst.

(2) The reactor is packed with granules of pumice impregnated with cobalt; a gas having the composition, $CO:H_2:ethylene=1:1:1$, is pressed in the reactor, concurrently with water at 200° C. at a pressure of 200 atm. The depletion of cobalt on the pumice is compensated for by the addition of cobalt salts of fatty acids to the feed water. The effluent contains 1–3 percent of propionaldehyde.

(3) Cobalt salts or copper salts are dissolved in water or in an organic solvent. For example, cobalt chloride, cobalt acetate and copper acetate may be dissolved in water or cobalt naphthenate, cobalt salt of acetylacetone and copper phenolate may be dissolved in an organic solvent; a mixed gas of olefine, hydrogen and carbon monoxide are pressed into the solution; the reaction is performed at 125–300° C. under 590–840 atm.

The above method (1) has the disadvantage of causing wear and tear on the pumps due to the suspended catalyst; the method (2) has the disadvantage that the space time yield is low; both (1) and (2) are complicated in the recovery of catalyst; and (3) requires higher temperature and pressure than generally practiced oxygenation conditions, and is industrially disadvantageous due to the low reaction velocity in spite of a large amount of catalyst used. Furthermore, good yields of water-soluble aldehydes can not be obtained.

One object of the present invention is to provide a new catalyst process for preparing water-soluble oxygen-containing organic compounds by reacting organic compounds having olefinic double bonds with carbon monoxide and hydrogen.

Another object is to produce water-soluble aldehyde with a good yield, under a milder reaction condition, with a lower concentration of catalyst, and at a higher reaction velocity, than the methods hitherto practiced.

Another object is to provide a process in which the catalyst contained in distillation bottom may be repeatedly recirculated to the succeeding oxygenation reaction zone without any intermediate regeneration.

Another object is to produce propionaldehyde, with industrial advantages, by reacting ethylene with carbon monoxide and hydrogen.

Another object is to produce butylaldehyde with industrial advantages, by reacting propylene with carbon monoxide and hydrogen.

These objects are accomplished by using cobalt carbonyl anion complex salts as a catalyst in an aqueous medium in a process for preparing water-soluble oxygen-containing organic compounds by reacting organic compounds having olefinic double bonds with carbon monoxide and hydrogen, the reaction being performed under catalytic oxygenation conditions of temperature and pressure.

The catalysts used for the present invention are cobalt carbonyl anion complex salts represented by the general formula:

$$M[Co(CO)_4]_n$$

where M represents a mono-, di-, or trivalent cation and $n$ represents a corresponding integer from 1–3. In the preferred embodiment M represents sodium, potassium, calcium or barium.

In the process for preparing water-soluble oxygen-containing organic compounds, it is important, for the continuous production of such compounds, that the catalyst is homogeneously dissolved in aqueous medium, that the space time yield is large, that the reaction velocity of catalyst is high, and that the reaction conditions are moderate. We have found that the cobalt carbonyl anion complex salts are excellent catalysts, soluble in water, and otherwise satisfy the above requirements. We have found, further, that such cobalt carbonyl anion complex salts can be recovered and that the preferred salts are quite stable.

For the preparation of cobalt carbonyl anion complex salts, the generally practised method is:

Cobalt chloride is dissolved in aqueous ammonia, to which ammonium chloride is added, and is reacted with hydrogen and carbon monoxide at 150° C. and at 200 atm. An acid is added thereto, and gaseous cobalt carbonyl hydride produced thereby is then reacted in an aqueous medium with the hydroxide of the above-mentioned metals, preferably sodium, potassium, barium and calcium.

In accordance with the invention, the reaction is performed by pressing mixed gas composed of carbon monoxide, hydrogen and a compound having an olefinic double bond, such as ethylene, into an aqueous solution of cobalt carbonyl anion complex salt, at 125–300° C. under 50–1,000 atm., preferably at from 160–200° C. and from 100–300 atm. A temperature over 160° C. is advatageous, because, at such temperature, no time lag exists before reaction starts. For mixed gas, the composition, $CO:H_2:olefine=1–2:1–2:1$, is generally used.

The cobalt carbonyl anion complex salts, obtained as above, are used in the present invention as follows:

The amount of cobalt carbonyl anion complex salts is not less than 0.5 g., desirably 0.5–10 g., more preferably 1–3 g., as cobalt contained in the cobalt carbonyl anion, per litre of aqueous medium. With less than 0.5 g./l. as cobalt contained in cobalt carbonyl anion, the reaction velocity is too low, which makes the process disadvantageous. With more than 10 g./l., especially more than 25 g./l., the increase of the reaction velocity is not enough to compensate for the increase in catalyst.

Under the above reaction conditions, water-soluble aldehyde can be obtained with a yield of 50–90%; yields of 75% and above may be obtained when the preferred salts are used. The great advantage of the invention is that the reaction velocity is extremely high. For example, an aqueous solution containing cobalt carbonyl sodium salt, at the concentration of 2 g./l. as cobalt, is charged in the reaction tower of 1 litre capacity which is maintained at 200 atm. The mixed gas composed of hydrogen, carbon monoxide and lower olefine is pressed thereinto, continuously at the rate of 0.3–1.5 m.³/hr. At the same time, the above aqueous solution is pressed into the reactor at the rate of 1–5 litre/hr. In this way, we can obtain oxygenated products at the rate of 0.1–0.2 kg./hr., and 50–80% thereof is aldehyde which is homogeneously dissolved in aqueous medium. This is really a remarkable result. It is evident that such reaction velocity is excellent compared with the methods hitherto practised. The reaction velocity of the cases in which various cobalt carbonyl anion complex salts are used at 160° C. under 200 atm. with cobalt concentration 3 g./l. is shown in the following Table I:

TABLE I

*Summary of relative reaction velocities*

| Cation of complex salt: | Relative reaction velocity |
|---|---|
| Na | 4.6 |
| K | 2.0 |
| NH$_4$ | 1.3 |
| Ba | 2.6 |
| Co | [1] 1.0 |
| Zn | 2.0 |
| Fe | 1.8 |
| Cu | 1.8 |
| Cr | 4.0 |
| Ca | 3.1 |

[1] Taken as standard for determination of relative reaction velocity.

As shown by the Table I, the reaction velocity is largest in the case of the complex salt of sodium, which is followed by complex salts of chromium, calcium, barium, potassium and zinc. Among these, the complex salts of sodium, potassium, barium and calcium have excellent stability under reaction conditions. Although chromium and zinc complex salts have a high reaction velocity, their stability is inferior.

TABLE II

*Summary of specific examples*

| Ex. No. | Cation of complex salt | Concentration (g./l. as cobalt) | Reaction temp. (° C.) | Time (min.) | Yield of propionaldehyde to ethylene reacted (percent) |
|---|---|---|---|---|---|
| 1 | Na | 3 | 180 | 30 | 75 |
| 2 | K | 3 | 160 | 40 | 76 |
| 3 | NH$_4$ | 3 | 160 | 40 | 50 |
| 4 | Ba | 2.8 | 160 | 30 | 78 |
| 5 | Co | 3 | 140 | 80 | 58 |
| 6 | Zn | 1 | 160 | 20 | 61 |
| 7 | Fe | 2 | 160 | 40 | 68 |
| 8 | K | 2 | 160 | (¹) | 76 |
| 9 | Cu | 2 | 160 | 90 | 50 |
| 10 | Cr | 2.5 | 160 | 90 | 58 |
| 11 | Ca | 3 | 160 | 60 | 76 |

¹ Space velocity of 4 liters/liter/hour.

As shown by the above Table II, when complex salts of sodium, potassium, calcium and barium are used, the yield (based on ethylene reacted) of propionaldehyde is considerably higher than that obtained by using other complex salts.

From the standpoint of yield, reaction velocity and stability the complex salts of sodium, calcium, barium and potassium are not only superior to the corresponding salts of chrominum and zinc as noted above, but are also markedly superior to the cobalt carbonyl anion complex salts of NH$_4$, Co, Fe and Cu (see table and examples). This is a surprising result which could not be predicted from properties of the cations alone.

In fact only the four complex salts enumerated above displayed both a relative reaction velocity of at least 2.0 and a yield of at least 75% (see tables).

In the method of the present invention, it is preferable to have the pH of the aqueous solution of cobalt anion complex salt within the range of from 3–9 to prevent corrosion of apparatus and to maintain a high reaction velocity. With a pH of about 2, cobalt carbonyl anion complex salt is changed into cobalt carbonyl hydride. In such case, although the reaction progresses initially at a low temperature of about 100° C., it stops en route, and furthermore corrosion of the apparatus occurs. Therefore, such pH range is undesirable. On the alkaline side when the pH is more than 9, the reaction velocity decreases. When the oxygenation reaction is performed within the pH range of from 3–9, in the present invention, the reaction can be performed with a remarkably high reaction velocity. In the present invention, the adjustment of pH of the aqueous solution may be carried out, like common neutralization, by using an inorganic acid such as hydrochloric acid, or an inorganic alkali such as sodium hydroxide.

The catalyst of the present invention shows no change at all, even after the water-soluble aldehyde is fractionally distilled off from the reaction mixture in an atmosphere of inert gas. The cobalt carbonyl anion complex salts used as catalyst according to the instant invention are highly stable under the above reaction and distillation conditions. It is, therefore, possible to recirculate the distillation bottom repeatedly, thus rendering the regeneration of catalyst unnecessary. The continuous production of an oxygenated product can be carried out therefore in a most advantageous way.

Since the catalyst of the present invention is stable, no loss is caused to the catalyst under suitable reaction conditions. In order to use the catalyst efficiently, neither should the high boiling by-product be formed nor the oily aldehyde be produced, because the reaction mixture should be maintained as a homogeneous aqueous solution. For obtaining such a homogeneous aqueous solution, it is preferable that if butylaldehyde is to be produced in the aqueous solution, its concentration should be less than 4%; if propionaldehyde is to be produced in the aqueous solution, its concentration should be less than 10%. When the concentration of the water-soluble aldehyde solution is larger than that indicated, the aldehyde existing in excess of the amount soluble in water becomes oily, and two phases are formed whereby a loss of catalyst occurs. When the corresponding concentrations are higher than is indicated above, a high boiling product is also produced. The existence of oily high boiling by-products also causes a loss of the catalyst. This loss of the catalyst is supposed to be caused by the change of cobalt carbonyl anion complex salt into cobalt carbonyl in the presence of above oily matters in the course of reaction and therefore by the dissolution of cobalt carbonyl into such oily matters. As the result thereof, 5–30% of catalyst is lost. As above-mentioned, the production of such oily matters is disadvantageous from the industrial viewpoint. It is needless to say that a proper concentration must be selected depending upon the compound to be produced, in case other oxygen-containing compounds are to be produced.

It must be noted that the method of the present invention is not confined to the oxygenation reaction of the above lower olefines, but can be applied where raw material having olefinic double bonds takes the form of a gas under reaction conditions, and the reaction product is water-soluble, such as ether, ester, carboxylic acid and aldehyde, having olefinic double bonds.

Specific embodiments of the process of the present invention are given hereunder. It must be noted, however, that the method is not limited to such examples. Various modifications and variations can be made within the scope of the invention. The examples are summarized in the table in column 3, lines 60 to 75.

EXAMPLE I 50 cc. of an aqueous solution, containing $$Na[Co(CO)_4]$$

in the amount of 3 g./l. as cobalt and adjusted to pH 6.5, was charged in an autoclave of 200 cc. capacity. A mixed gas having the composition, $$CO:H_2:ethylene = 1:1:1$$

was led thereinto at 200 atm., and the reaction was preformed at 180° C. for 30 minutes. The gas absorption velocity was 1.2 atm./min. No production of oily layer was seen. By distilling the reaction mixture in the atmosphere of nitrogen gas, 2.1 g. of propionaldehyde was obtained. The yield was 75% to ethylene reacted.

EXAMPLE II 50 cc. of an aqueous solution, containing $K[Co(CO)_4]$ in the amount of 3 g./l. as cobalt and adjusted to pH 6.0 was charged in an autoclave of 200 cc. capacity. A mixed gas having the composition, $$CO:H_2:ethylene = 1:1:1$$

was led thereinto at 200 atm., and the reaction was performed at 160° C. for 40 minutes. The gas absorption velocity was 0.6 atm./min. No production of oily layer was seen. By distilling the reaction mixture in the atmosphere of nitrogen gas, 1.5 g. of propionaldehyde was obtained. The yield was 76% to ethylene reacted.

EXAMPLE III 50 cc. of an aqueous solution, containing $$NH_4[Co(CO)_4]$$

in the amount of 3 g./l. as cobalt and adjusted to pH 7.0 was charged in an autoclave and the reaction was performed as in Example II. The gas absorption velocity was 0.4 atm./min. 1.0 g. of propionaldehyde was obtained. The yield was 50% to ethylene reacted (or about 25% less than that obtained according to the preceding examples).

EXAMPLE IV 50 cc. of an aqueous solution, containing $$Ba[Co(CO)_4]_2$$

in the amount of 2.8 g./l. as cobalt and adjusted to pH 7.5 was charged in an autoclave of 200 cc. capacity. A mixed gas having the composition, $$CO:H_2:ethylene = 1:1:1$$

was led thereinto at 200 atm., and the reaction was performed at 160° C. for 30 minutes. The process of the Example I was thereafter repeated, and 1.9 g. of propionaldehyde was obtained. The gas absorption velocity was 0.8 atm./min. The yield was 78% to ethylene reacted.

EXAMPLE V 50 cc. of an aqueous solution, containing $$Co[Co(CO)_4]_2$$

in the amount of 3 g./l. as cobalt (cobalt in cobalt carbonyl anion) and adjusted to pH 7.0 was charged in an autoclave of 200 cc. capacity. A mixed gas having the composition, $CO:H_2:ethylene = 1:1:1$, was led thereinto at 200 atm., and the reaction was performed at 140° C. for 80 minutes. The gas absorption velocity was 0.3 atm./min. The process of the Example I was thereafter repeated, and 1.2 g. of propionaldehyde was obtained. The yield was 58% to ethylene reacted (or about 20% less than that obtained according to the preceding examples).

EXAMPLE VI 50 cc. of an aqueous solution, containing $$Zn[Co(CO)_4]_2$$

in an amount of 1.0 g./l. as cobalt and adjusted to pH 5.2 was charged in an autoclave of 200 cc. capacity. A mixed gas having the composition, $$CO:H_2:propylene = 1:1:1$$

was led thereinto at 200 atm., and the reaction was performed at 160° C. for 20 minutes. The gas absorption velocity was 0.4 atm./min. The process of the Example I was thereafter repeated, and 0.5 g. of butyladehyde was obtained. The yield was 61% to propylene reacted.

EXAMPLE VII 50 cc. of an aqueous solution, containing $$Fe[Co(CO)_4]_2$$

in an amount of 2.0 g./l. as cobalt and adjusted to pH 5.2 was charged in an autoclave of 200 cc. capacity. A mixed gas having the composition, $$CO:H_2:ethylene = 1:1:1$$

was led thereinto at 200 atm., and the reaction was performed at 160° C. for 40 minutes. The gas absorption velocity was 0.5 atm./min. The process of the Example I was thereafter repeated, and 1.1 g. of propionaldehyde was obtained. The yield was 68% to ethylene reacted.

EXAMPLE VIII

In the reactor of 2 litre capacity, maintained at 160° C. under 200 atm. by the mixed gas having the composition, $CO:H_2:ethylene = 1:1:1$, an aqueous solution, containing $K[Co(CO)_4]$ in the amount of 2 g./l. as cobalt was pressed at the rate of 8 litre/hr. At the same time a mixed gas having the above composition, was pressed therein at the rate of 1.2 m.³/hr. and the reaction was performed. After separating reaction mixture from gas by a high pressure separator, the reaction mixture was transferred to the distillator. By the distillation under normal pressure in the atmosphere of nitrogen gas, 40 g. of propionaldehyde and 8 g. of α-methyl-β-ethylacrolein were obtained from 1 liter of the reaction mixture. In the bottom, the cobalt carbonyl potassium salt remained without being subjected to any change, and therefore, was pressed into the reactor for the repeated operation, and the same result was obtained as above-mentioned.

EXAMPLE IX 50 cc. of an aqueous solution, containing $$Cu[Co(CO)_4]$$

in an amount of 2.0 g./l. as cobalt and adjusted to pH 3.0 was charged in an autoclave of 200 cc. capacity. A mixed gas having the composition, $CO:H_2:ethylene = 1:1:1$, was led thereinto at 200 atm., and the reaction was performed at 160° C. for 90 minutes. The process of the Example I was thereafter repeated, and 3.6 g. of propionaldehyde was obtained. The yield was 50% to ethylene reacted.

EXAMPLE X 50 cc. of an aqueous solution, containing $$Cr[Co(CO)_4]_3$$

in an amount of 2.5 g./l. as cobalt and adjusted to pH 3.0 was charged in an autoclave of 200 cc. capacity. A mixed gas having the composition, $CO:H_2:ethylene=1:1:1$, was led thereinto at 200 atm., and the reaction was performed at 160° C. for 90 minutes. The process of the Example I was thereafter repeated, and 2.2 g. of propionaldehyde was obtained. The yield was 58% to ethylene reacted.

EXAMPLE XI 50 cc. of an aqueous solution, containing $$Ca[Co(CO)_4]_2$$

in the amount of 3 g./l. as cobalt and adjusted to pH 7.0, was charged in an autoclave of 200 cc. capacity. A mixed gas having the composition, $CO:H_2:ethylene=1:1:1$, was led thereinto at 200 atm., and the reaction was performed at 160° C. for 60 minutes. The gas absorption velocity was 0.8 atm./min. No production of oily layer was seen. By distilling the reaction mixture in the atmosphere of nitrogen gas, 2.5 g. of propionaldehyde was obtained. The yield was 76% based on ethylene reacted.

EXAMPLE XII

The reaction in Example XI was repeated under following various pressures of the mixed gas, in order to vary the concentration of propionaldehyde in the reaction mixture, whereby the following results were obtained:

| Reaction pressure (atm.) | Concentration of propionaldehyde in reaction mixture (percent) | Oil | Loss of catalyst in aqueous solution (percent) | Yield of propionaldehyde to ethylene reacted (percent) |
| --- | --- | --- | --- | --- |
| 200 | 3.9 | none | 0 | 76 |
| 500 | 9.7 | trace | 5 | 72 |
| 600 | 12.0 | some | 28 | 58 |

EXAMPLE XIII 50 cc. of an aqueous solution, containing $NaCo(CO)_4$ in the amount of 3 g./l. as cobalt and adjusted to pH 7.0, was charged in an autoclave of 200 cc. capacity Propylene, carbon monoxide and hydrogen were led thereinto, at the ratio of $CO:H_2:propylene=1:1:1$, under following various pressures, whereby the following results were obtained:

| Reaction pressure (atm.) | Concentration of butylaldehyde in reaction mixture (percent) | Oil | Loss of catalyst in aqueous solution (percent) | Yield of butylaldehyde to propylene reacted (percent) |
| --- | --- | --- | --- | --- |
| 200 | 2.4 | none | 0 | 88 |
| 400 | 4.2 | some | 24 | 73 |

We claim:

1. The process for preparing water-soluble oxygen-containing organic compounds by reacting, in the presence of a catalyst, a lower olefin with carbon monoxide and hydrogen wherein the catalyst is a cobalt carbonyl anion complex salt represented by the general formula:

$$M[Co(CO)_4]_n$$

where M is a member selected from the group consisting of potassium, sodium, barium and calcium and $n$ is an integer equal to the valence of M, said catalyst being dissolved in an aqueous medium and the reaction being performed at a temperature of from 125° to 300° C. under a pressure of from 50 to 1000 atmospheres.

2. The process for preparing water-soluble oxygen-containing organic compounds by reacting, in the presence of a catalyst, a lower olefin with carbon monoxide and hydrogen wherein the catalyst is a cobalt carbonyl anion complex salt represented by the general formula:

$$M[Co(CO)_4]_n$$

where M is a member selected from the group consisting of sodium, potassium, barium and calcium and $n$ is an integer equal to the valence of M, said catalyst being dissolved in an aqueous medium so that the concentration thereof is not less than 0.5 g./l. as cobalt in the form of cobalt carbonyl anion, and the reaction is performed at a temperature of from 125° to 300° C. under a pressure of from 50 to 1000 atmospheres.

3. The process according to claim 1 wherein the pH of the aqueous solution of the cobalt carbonyl anion complex salt is adjusted to a value between 3 and 9.

4. The process according to claim 1 wherein the amount of aqueous medium is sufficient to obtain a homogeneous solution as reaction mixture.

5. The process according to claim 1 wherein oxygen-containing organic compounds are distilled off from the reaction mixture, and cobalt carbonyl anion complex salt, which remains as bottom, is repeatedly recirculated for the oxygenation reaction.

6. The process for preparing water-soluble oxygen-containing organic compounds which comprises reacting ethylene, in the presence of a catalyst, with carbon monoxide and hydrogen wherein: (1) the catalyst is a cobalt carbonyl anion complex salt represented by the general formula:

$$M[Co(CO)_4]_n$$

where M is a member selected from the group consisting of sodium, potassium, barium and calcium and $n$ is an integer equal to the valence of M, said catalyst being dissolved in an aqueous medium, the concentration in said aqueous medium of cobalt in the form of cobalt carbonyl anion being from 0.5 to 10 g./l., (2) the reaction is performed at a temperature of from 160° to 200° C. under a pressure of from 100 to 300 atmospheres, (3) the pH of said aqueous medium is adjusted to a value from 3 to 9, and (4) the concentration of propionaldehyde in the reaction mixture is less than 10%.

7. The process for preparing water-soluble oxygen-containing organic compounds which comprises reacting propylene, in the presence of a catalyst with carbon monoxide and hydrogen wherein: (1) the catalyst is a cobalt carbonyl anion complex salt represented by the general formula $$M[Co(CO)_4]_n$$

where M is a member selected from the group consisting of sodium, potassium, barium and calcium and $n$ is an integer equal to the valence of M, said catalyst being dissolved in an aqueous medium, the concentration in said aqueous medium of cobalt in the form of cobalt carbonyl anion being from 0.5 to 10 g./l., (2) the reaction is performed at a temperature of from 160° to 200° C. under a pressure of from 100 to 300 atmospheres, (3) the pH of said aqueous medium is adjusted to a value from 3 to 9, and (4) the concentration of butyl aldehyde in the reaction mixture is less than 4%.

References Cited in the file of this patent

UNITED STATES PATENTS

| 2,705,729 | Fasce et al. | Apr. 5, 1955 |
| 2,744,936 | Mertzweiller | May 8, 1956 |
| 2,757,205 | Mertzweiller et al. | July 31, 1956 |
| 2,767,217 | Moise et al. | Oct. 16, 1956 |

OTHER REFERENCES

Blanchard: Chemical Reviews, vol. 21, pages 15–19 (1937).

Wender et al.: J.A.C.S., col. 74 (1952), pages 1216–19.

Martin: Chemistry and Industry, pages 1536–7, Dec. 11, 1954.

Reppe et al.: Justus Liebig's Annalen der Chemie, vol. 582, pages 133–5, 147.